United States Patent
Armorer

(10) Patent No.: US 8,478,952 B1
(45) Date of Patent: Jul. 2, 2013

(54) FLEXIBLE OPTIMIZED GROUP-BASED BACKUPS

(75) Inventor: Peter Armorer, Mississauga (CA)

(73) Assignee: EMC Corporation, Hopkinton, MA (US)

( * ) Notice: Subject to any disclaimer, the term of this patent is extended or adjusted under 35 U.S.C. 154(b) by 42 days.

(21) Appl. No.: 11/452,458

(22) Filed: Jun. 13, 2006

(51) Int. Cl.
- G06F 12/00 (2006.01)
- G06F 13/00 (2006.01)
- G06F 13/28 (2006.01)

(52) U.S. Cl.
USPC ........... 711/162; 711/111; 711/151; 711/158; 707/204; 718/102; 718/104

(58) Field of Classification Search
USPC .................. 718/104, 102; 711/162, 111, 151, 711/158; 707/204
See application file for complete search history.

(56) References Cited

U.S. PATENT DOCUMENTS

| | | | | |
|---|---|---|---|---|
| 5,623,471 A * | 4/1997 | Prigge | | 369/84 |
| 5,854,754 A * | 12/1998 | Cabrera et al. | | 703/2 |
| 6,226,759 B1 * | 5/2001 | Miller et al. | | 714/6 |
| 6,691,212 B1 * | 2/2004 | McNeil et al. | | 711/162 |
| 6,742,092 B1 * | 5/2004 | Huebsch et al. | | 711/162 |
| 6,941,379 B1 * | 9/2005 | Dingsor et al. | | 709/235 |
| 7,103,740 B1 * | 9/2006 | Colgrove et al. | | 711/162 |
| 7,203,805 B2 * | 4/2007 | McNeil et al. | | 711/162 |
| 7,467,267 B1 * | 12/2008 | Mayock | | 711/162 |
| 2002/0099844 A1 * | 7/2002 | Baumann et al. | | 709/232 |
| 2004/0088417 A1 * | 5/2004 | Bober et al. | | 709/227 |

OTHER PUBLICATIONS

Tanenbaum, Andrew, "Structured Computer Organization", Third Edition. Prentice Hall, p. 11.*

* cited by examiner

*Primary Examiner* — Stephen Elmore
*Assistant Examiner* — Mark Giardino, Jr.
(74) *Attorney, Agent, or Firm* — Van Pelt, Yi & James LLP

(57) ABSTRACT

Data indicating a plurality of groups into which data to be accessed from one or more storage media has been divided is received. For each of at least a subset of the groups a parallelization limit for that group is received. A first parallelization limit for a first group in the subset is not necessarily same as a second parallelization limit for a second group in the subset.

31 Claims, 4 Drawing Sheets

FLEXIBLE OPTIMIZED GROUP-BASED BACKUPS

BACKGROUND OF THE INVENTION

When performing a backup task, parallel backup streams are used to speed up the backup task. However if too many backup streams are executed in parallel to perform the backup task, the backup task can take longer than executing a lower number of backup streams in parallel. For example, a large number of backup streams can cause disk head thrashing and/or overloading of computational resources. To prevent the potential execution of too many parallel streams, an upper limit on the total number of parallel backup streams can be specified in some systems. Since the upper limit will likely be associated with the slowest bottleneck instance of a system (e.g. disk#001 out of five disks #001-#005), additional backup streams that do not utilize that bottleneck instance may not be executed if the upper limit is reached. This can lead to under utilization of some backup components and below-optimal aggregate backup throughput. Therefore there exists a need for a flexible way to aggregate backup throughput.

BRIEF DESCRIPTION OF THE DRAWINGS

Various embodiments of the invention are disclosed in the following detailed description and the accompanying drawings.

DETAILED DESCRIPTION

Figure 1:
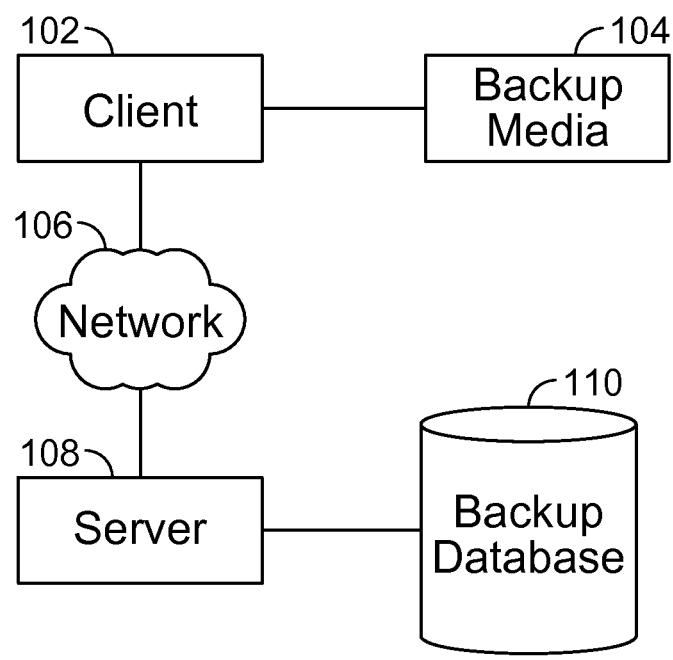
FIG. 1 illustrates an embodiment of a backup system environment.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configuring parallelization of a task is disclosed. In some embodiments, data to be accessed from one or more storage media (e.g., data to be backed up) is divided into one or more groups. Each group is associated with a limit on the number of parallel streams/threads/processes used to process the group. The parallelization limit for one group is not necessarily the same parallelization limit for another group. In some embodiments, the parallelization limit is based at least in part on a parallelization limitation associated with the corresponding group. In various embodiments, the groups are determined in a manner that is associated with one or more bottlenecks in the parallel task. In some embodiments, the groups are associated with one or more of the following: a parent file system, a parent logical volume, a logical volume group, a parent RAID disk, a disk hardware controller, a named pipe data writer, a disk connection type, and a remote destination backup device. In some embodiments, a file system includes at least a portion of a physical disk that has been formatted and made usable to store files. In some embodiments, a logical volume includes a virtual file system composed of at least portions of one or more physical disks. In some embodiments, a logical volume group includes a logical grouping of a plurality of logical volumes. In some embodiments, a named pipe includes a pseudo file that allows a data writer/reader process (e.g., Database Management System engine) to produce/consume data for another reader/writer process (e.g., backup process).

FIG. 1 illustrates an embodiment of a backup system environment. In the example shown, client 102 is connected to server 108 through network 106. There can be any number of clients and servers connected to the network. The network may be any public or private network and/or combination thereof, including without limitation an intranet, LAN, WAN, and other forms of connecting multiple systems and or groups of systems together. Client 102 is connected to backup media 104. In some embodiments, the backup media can be one or more of the following storage media: hard drive, tape drive, optical storage unit, and any non-volatile memory device. More than one backup media can exist. In an embodiment, backup media 104 is connected directly to the network. In another embodiment, backup media 104 is connected to server 108. In another embodiment, backup media 104 is connected to client 102 through a SAN (Storage Area Network). Backup database 110 is connected to server 108. In an embodiment, backup database 110 contains data associated with data on one or more clients and/or servers. In another embodiment, backup database 110 contains data associated with data written to one or more backup media. In another embodiment, backup database 110 is directly connected to the network. In another embodiment, backup database 110 is connected to client 102. In another embodiment, backup database 110 is a part of server 108 and/or client 102. In an embodiment, backup of client 102 is coordinated by server 108. Server 108 instructs the client to backup data to backup media 104. When the data is successfully written to the backup media, a record is made on backup database 110. In another embodiment, server 108 cooperates with a backup agent running on client 102 to coordinate the backup.

Figure 2:
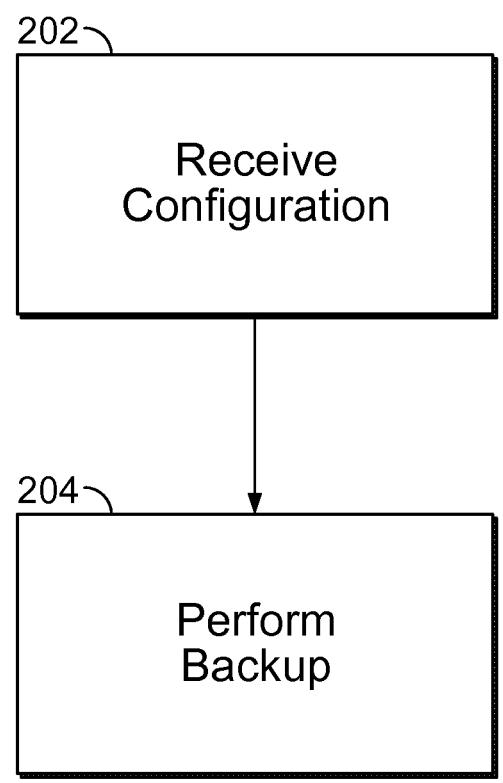
FIG. 2 is a block diagram illustrating an embodiment of a process for performing a backup.

FIG. 2 is a block diagram illustrating an embodiment of a process for performing a backup. At 202, a configuration is received. In some embodiments, receiving the configuration includes receiving data associated with one or more groupings of data to be backed up and/or a backup parallelization parameter of the groupings. In various embodiments, the groupings are associated with limitations on one or more backup resources and/or components. The parallelization parameters include one or more of the following: information used at least in part to group data to be backed up, one or more file system paths associated with a backup group, a maximum parallelization associated with a backup grouping, a maximum parallelization associated with all backup groupings, and a type of backup to be performed on one or more backup groupings. The parallelization parameters may be specified in one or more of the following: a configuration text file, a backup process configuration, a backup application configuration, a system configuration, and an indication in response to a user interface prompt.

The following is an example of at least a portion of a configuration parameter that could be specified in a configuration text file.

SAVE_PARALLELISM_GROUP_0=4; /a/b/c/; /d/e/f/;
SAVE_PARALLELISM_GROUP_1=8; /t/u/v/; /x/y/z/;
SAVE_PARALLELISM_OVERALL=10;

"SAVE_PARALLELISM_GROUP_0" is associated with a maximum limit of 4 parallel active save streams to backup all subdirectories and files under the paths "/a/b/c/" and "/d/e/f/." "SAVE_PARALLELISM_GROUP_1" is associated with a maximum limit of 8 parallel active save streams to backup all subdirectories and files under the paths "/t/u/v/" and "/x/y/z/." In the above example, "SAVE_PARALLELISM_GROUP_1" is associated with a larger maximum limit than "SAVE_PARALLELISM_GROUP_0" due to a faster disk controller (or some other bottleneck resource type) associated with SAVE_PARALLELISM_GROUP_1." In this example, "SAVE_PARALLELISM_OVERALL" specifies a maximum limit of the total number of parallel save streams assigned across all backup groups. For example, a backup scheduler will assign/start active save streams one at a time to/from each group. If a group's maximum parallelization limit is reached, the group is bypassed. The save streams are assigned until "SAVE_PARALLELISM_OVERALL" limit is reached or each group with remaining tasks has reached its group maximum limit, whichever occurs first. In some embodiments, no separate overall parallelism limit is specified. At 204, the backup is performed. In some embodiments, performing the backup includes scheduling backup threads/processes/streams in a manner associated with the received configuration.

Figure 3:
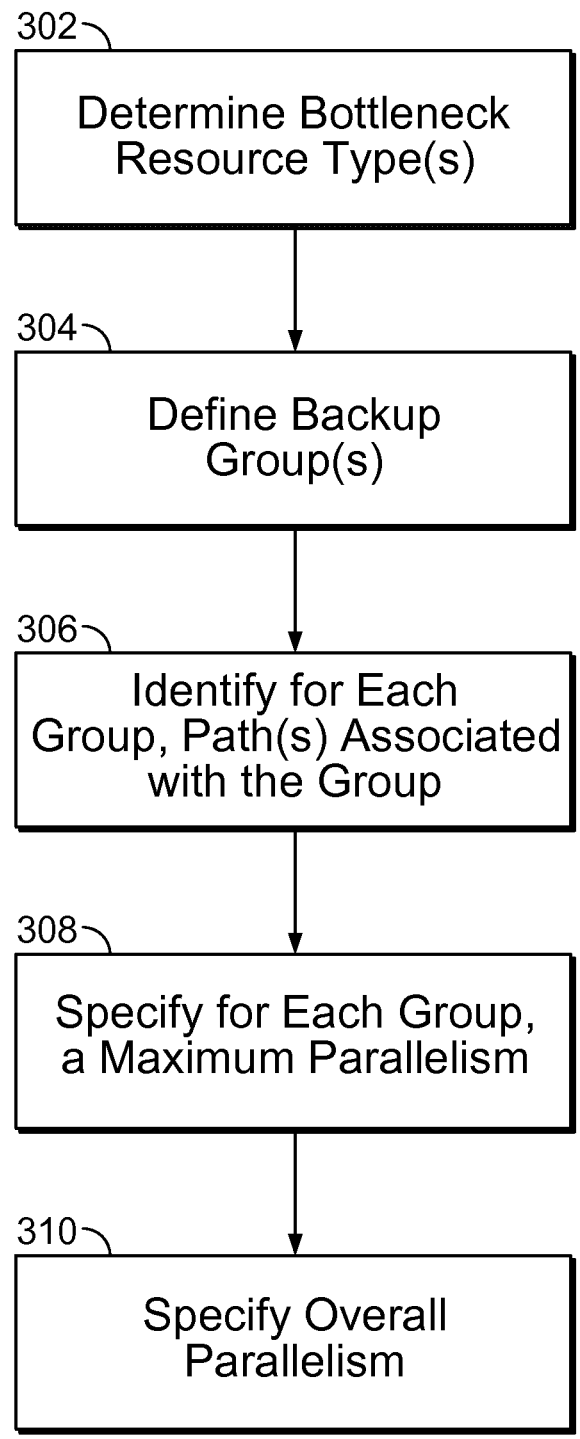
FIG. 3 is a flow chart illustrating an embodiment of a process for configuring parallelism of a backup task.

FIG. 3 is a flow chart illustrating an embodiment of a process for configuring parallelism of a backup task. In the embodiments, the process of FIG. 3 is included in 202 of FIG. 2. At 302, one or more bottleneck resource types are determined. In some embodiments, determining bottleneck resources types includes determining performance limitations associated with resources utilized when performing the backup task (e.g., slowest bottleneck resource type—disk hardware vs. file system software). For example, resources associated with the highest utilization and/or over utilization when performing the backup task are identified. In various embodiments, performance limitations include a parallelization limitation, a data bandwidth limitation, and/or a processing limitation. At 304, one or more backup groups are defined. Defining the backup groups includes dividing data to be backed up into one or more groups. In some embodiments, the groups are associated with one or more of the following: the determined bottleneck resource(s), backup performance limitations associated with the backup components, a file system directory structure, a parent file system, a parent logical volume, a logical volume group, a parent RAID disk, a disk hardware controller, a named pipe data writer, a disk connection type, and a remote destination backup device. The backup groups may be defined by a user and/or automatically determined. In the example described above, for example, a first group (GROUP_0) was defined for data associated with a first disk controller that has different performance characteristics (in this example is slower than) a second disk controller for which a second group (GROUP_1) was defined. At 306, for each group, one or more paths associated with the backup is/are identified. A path of a backup group includes one or more file system paths of files and/or directories to be backed up when processing the group. In some embodiments, identifying the paths includes determining files and/or directories associated with bottleneck resources related to each of the groups. In the example described above, paths /a/b/c and /d/e/f have been associated with GROUP_0 and paths /t/u/v and /x/y/z have been associated with GROUP_1. At 308, for each group, a maximum parallelism is specified. The maximum parallelism of a group determines the maximum number of parallel backup threads/processes/streams started and running at any one time to backup data of the group. In various embodiments, the maximum parallelism is specified using one or more of the following: a predetermined value, a characteristic of bottleneck resource(s) associated with each group, and performance data of a configuration test and/or a previous backup session. At 310, overall parallelism for all groups is specified. The overall parallelism includes a maximum of the total number of parallel backup threads/processes/streams used at any one instance across all backup groups. In various embodiments, the overall parallelism limit is determined using one or more of the following: a predetermined value, system configuration data, a characteristic of a backup system, and performance data of a configuration test data and/or a previous backup. In some embodiments, specification of the overall parallelism limit is optional.

Figure 4:
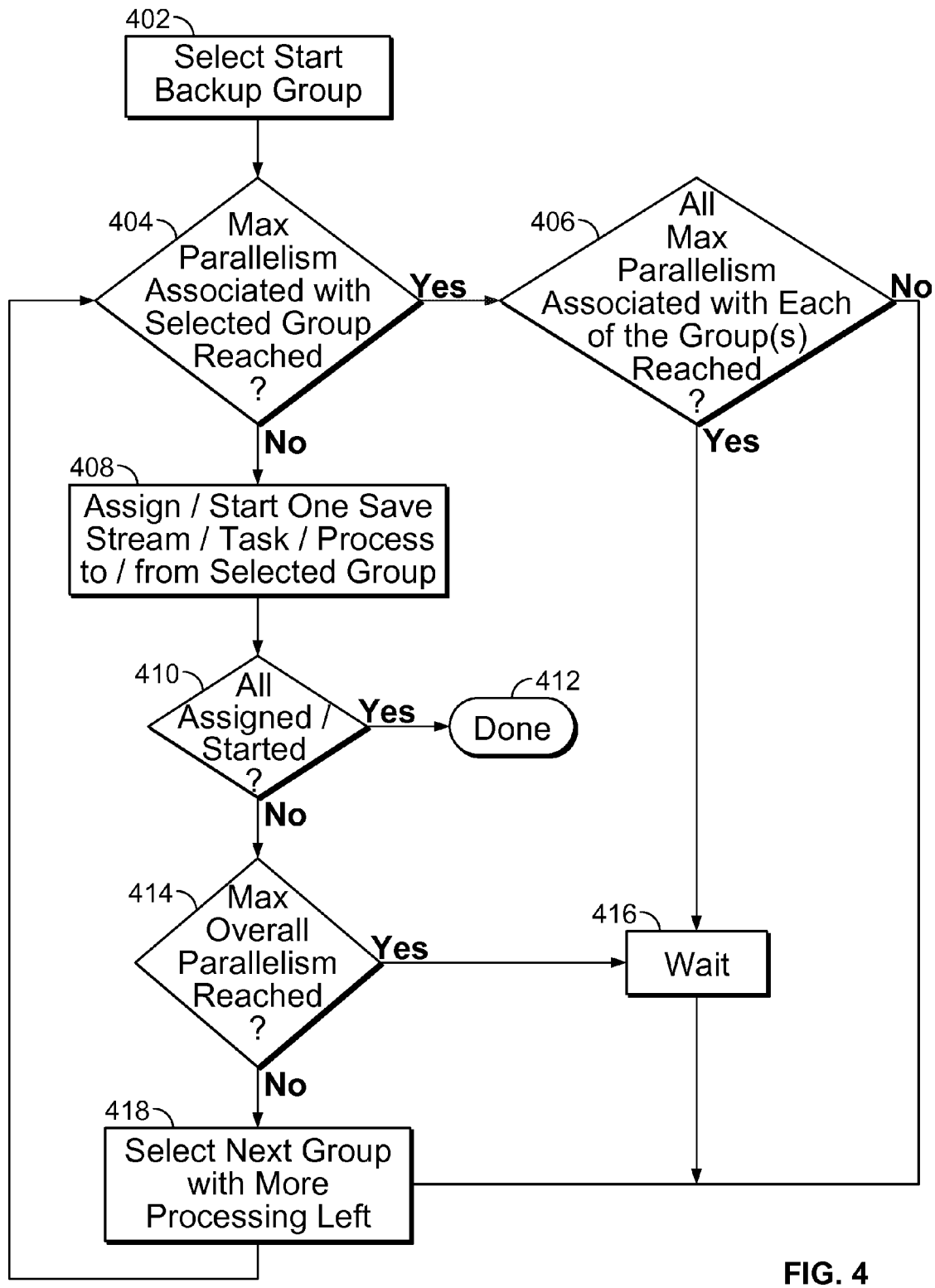
FIG. 4 is a flow chart illustrating and embodiment of a process for performing save/backup stream/task/process start-up scheduling.

FIG. 4 is a flow chart illustrating and embodiment of a process for performing save/backup stream/task/process start-up scheduling. In some embodiments, the process of FIG. 4 is included in 204 of FIG. 2. At 402, a starting backup group is selected. The starting group selection may be pre-configured, random, and/or determined using a selection algorithm. At 404, if is determined that maximum parallelism associated with the selected group has not been reached, at 408, one save stream/thread/process is assigned to the selected group. At 410, if it is determined that no further not started (i.e., unstarted) savestream/task remains for any group, at 412, the process ends. In some embodiments, 412 is associated with completion of start-up scheduling. For example, at 412 there exists no more saves/tasks/streams/processes from any group to be started, and the process waits for current saves/tasks/streams/processes to finish before completing the backup. If additional data remains to be assigned, it is determined at 414 whether the maximum overall parallelism has been reached. For example, maximum overall parallelism limit is reached when all available backup streams have been assigned and/or the sum of the number of backup streams running in parallel reaches a specified number. If the maximum overall parallelism limit has been reached, at 416, the process waits. In some embodiments, at 416, the process waits until a save stream finishes. A save stream becomes available when an assigned save stream has completed and/or finished processing the assigned group. In some embodiments, at 416, the process waits for one or more already-started and currently running saves/tasks/streams/processes from one or more groups to finish. If at 414 it is determined that the maximum overall parallelism limit has not been reached, at 418, a next group is selected, and, at 404, maximum parallelism determination is made with respect to the selected group. In some embodiments, the next group is selected using round-robin selection. An example of the round-robin selection includes selecting a different group on each iteration such that the same group is never selected two times in a row when there is some other group that has unstarted streams (i.e. save processes) and is under its own parallelism limit. In some embodiments, if a maximum parallelization limit associated with a group has been reached, the group is not selectable. In various embodiments, one or more of a variety of selection methods are used. For example, a selectable group with the lowest number of assigned/started/running save processes (or the lowest ratio of the number of assigned/started/running save processes to the number of un-started saves) is at least in part used to select the next group. In some embodiments, the selecting the next group includes selecting the group with the lowest number of running saves, and if there is a tie between two or more groups, one of the tied groups with the largest number of unassigned/unstarted saves is selected. In some embodiments, a tie between groups to be selected is broken by a fixed order (e.g. group name lexicographic order). In some embodiments, groups with a larger number un-started saves are given priority when selecting the next group. At 404, if it is determined maximum parallelism limit associated with a selected group has been reached, at 406, it is determined whether all maximum parallelism limits associated with each of the groups have been reached. At 406, if all maximum parallelism limits associated with each of the groups have not been reached, at 418, a next group is selected. At 406, if all maximum parallelism limits associated with each of the groups have been reached, at 416, the process waits.

Although the example of the backup task has been used above, the parallelization configuration and scheduling can be used in other applications. In various embodiments, the parallelization configuration and scheduling can be used in disk-read and/or disk-writes scheduling. For example, disk requestor processes pre-register for parallel disk sessions that are configured and/or scheduled as described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving at a processor configuration data indicating that data to be backed up is divided into a plurality of backup groups, including a first backup group and a second backup group; and
backing up subdirectories and files under a first set of file system paths into the first backup group and backing up subdirectories and files under a second set of file system paths into the second backup group, wherein the backing up into the first backup group uses a first bottleneck resource, and wherein the backing up into the second backup group uses a second bottleneck resource, and wherein the backing up into the first backup group is limited by a first parallelization limit based at least in part on the first bottleneck resource, and wherein the backing up into the second backup group is limited by a second parallelization limit based at least in part on the second bottleneck resource.

2. The method as recited in claim 1, wherein for at least one group, the corresponding parallelization limit is based at least in part on a parallelization limitation associated with that group.

3. The method as recited in claim 2, wherein the parallelization limitation is associated with one or more of the following: a utilization limitation, a data bandwidth limitation, and a processing limitation.

4. The method as recited in claim 1, wherein the parallelization limit includes a maximum limit of the number of parallel streams used at any one instance to process the group associated with the parallelization limit.

5. The method as recited in claim 1, wherein the parallelization limit was determined using one or more of the following: a predetermined value, the performance of a configuration test, the performance of a previous processing, and a resource capacity limit calculation for the groups' bottleneck instances.

6. The method as recited in claim 1, wherein the backup is stored in a storage media, and wherein the storage media includes one or more of the following: a hard drive, a tape drive, a magnetic storage drive, an optical storage unit, and a non-volatile memory device.

7. The method as recited in claim 1, wherein the division of the data into groups was based on a performance limitation associated with one or more components or resources to be used in backing up the data.

8. The method as recited in claim 1, further comprising receiving for each of at least a subset of the groups a type of backup to be performed for that group.

9. The method as recited in claim 1, wherein the configuration data indicating the plurality of backup groups and the parallelization limits are received using one or more of the following: a configuration text file, a backup process configuration, a backup application configuration, a system configuration, and an indication in response to a user interface prompt.

10. The method as recited in claim 1, wherein the first parallelization limit is not same as the second parallelization limit due to a faster disk controller associated with the first backup group.

11. The method as recited in claim 1, further comprising receiving an overall parallelization limit including a maximum limit of the total number of parallelism at any one instance across the entire plurality of groups.

12. The method as recited in claim 1, further comprising backing up the data by scheduling backup tasks in accordance with the one or more parallelization limits.

13. The method as recited in claim 12, wherein scheduling the backup tasks includes using a round-robin selection to assign the backup tasks to the groups, wherein the round-robin selection includes selecting a different group on each backup task assignment iteration such that no selectable group has been selected two times in a row when exists another group that includes unassigned/unstarted tasks, and the selectable group is a group that has not reached the parallelization limit of the group.

14. The method as recited in claim 12, wherein scheduling the backup tasks includes identifying the group with the lowest number of assigned backup tasks.

15. The method as recited in claim 12, wherein scheduling the backup tasks includes determining for a group, a ratio of the number assigned backup tasks to the number of unassigned backup tasks.

16. The method as recited in claim 1, wherein the plurality of groups are associated with one or more of the following: a file system directory structure, a parent file system, a parent logical volume, a logical volume group, a parent RAID disk, a disk hardware controller, a named pipe data writer, a disk connection type, and a remote destination backup device.

17. The method as recited in claim 1, wherein the groups are associated with disk-read or disk-write scheduling.

18. A system, comprising:
a processor configured to:
receive configuration data indicating that data to be backed up is divided into a plurality of backup groups, including a first backup group and a second backup group, and
back up subdirectories and files under a first set of file system paths into the first backup group and back up subdirectories and files under a second set of file system paths into the second backup group, wherein the backing up into the first backup group uses a first bottleneck resource, and wherein the backing up into the second backup group uses a second bottleneck resource, and wherein the backing up into the first backup group is limited by a first parallelization limit based at least in part on the first bottleneck resource, and wherein the backing up into the second backup group is limited by a second parallelization limit based at least in part on the second bottleneck resource; and
a memory coupled with the processor, wherein the memory is configured to provide the processor with instructions.

19. The system of claim 18, wherein for at least one group, the corresponding parallelization limit is based at least in part on a parallelization limitation associated with that group.

20. The system of claim 19, wherein the parallelization limitation is associated with one or more of the following: a utilization limitation, a data bandwidth limitation, and a processing limitation.

21. The system of claim 18, wherein the parallelization limit includes a maximum limit of the number of parallel streams used at any one instance to process the group associated with the parallelization limit.

22. The system of claim 18, wherein the division of the data into groups was based on a performance limitation associated with one or more components or resources to be used in backing up the data.

23. The system of claim 18, wherein the processor is further configured to:
receive an overall parallelization limit including a maximum limit of the total number of parallelism at any one instance across the entire plurality of groups.

24. The system of claim 18, wherein the processor is further configured to:
back up the data by scheduling backup tasks in accordance with the one or more parallelization limits.

25. A non-transitory computer program product, the computer program product being embodied in a computer readable storage medium and comprising computer instructions for:
receiving configuration data indicating that data to be backed up is divided into a plurality of backup groups, including a first backup group and a second backup group; and
backing up subdirectories and files under a first set of file system paths into the first backup group and backing up subdirectories and files under a second set of file system paths into the second backup group, wherein the backing up into the first backup group uses a first bottleneck resource, and wherein the backing up into the second backup group uses a second bottleneck resource, and wherein the backing up into the first backup group is limited by a first parallelization limit based at least in part on the first bottleneck resource, and wherein the backing up into the second backup group is limited by a second parallelization limit based at least in part on the second bottleneck resource.

26. The computer program product of claim 25, wherein for at least one group, the corresponding parallelization limit is based at least in part on a parallelization limitation associated with that group.

27. The computer program product of claim 26, wherein the parallelization limitation is associated with one or more of the following: a utilization limitation, a data bandwidth limitation, and a processing limitation.

28. The computer program product of claim 25, wherein the parallelization limit includes a maximum limit of the number of parallel streams used at any one instance to process the group associated with the parallelization limit.

29. The computer program product of claim 25, wherein the division of the data into groups was based on a performance limitation associated with one or more components or resources to be used in backing up the data.

30. The computer program product of claim 25, further comprising computer instructions for:
receiving an overall parallelization limit including a maximum limit of the total number of parallelism at any one instance across the entire plurality of groups.

31. The computer program product of claim 25, further comprising computer instructions for:
backing up the data by scheduling backup tasks in accordance with the one or more parallelization limits.

* * * * *